Jan. 8, 1963     F. D. PERKINS, JR     3,071,962
CONSISTENCY RESPONSIVE DEVICE
Filed July 10, 1959     4 Sheets-Sheet 1

Jan. 8, 1963 F. D. PERKINS, JR 3,071,962
CONSISTENCY RESPONSIVE DEVICE
Filed July 10, 1959 4 Sheets-Sheet 3

Jan. 8, 1963  F. D. PERKINS, JR  3,071,962
CONSISTENCY RESPONSIVE DEVICE
Filed July 10, 1959  4 Sheets-Sheet 4
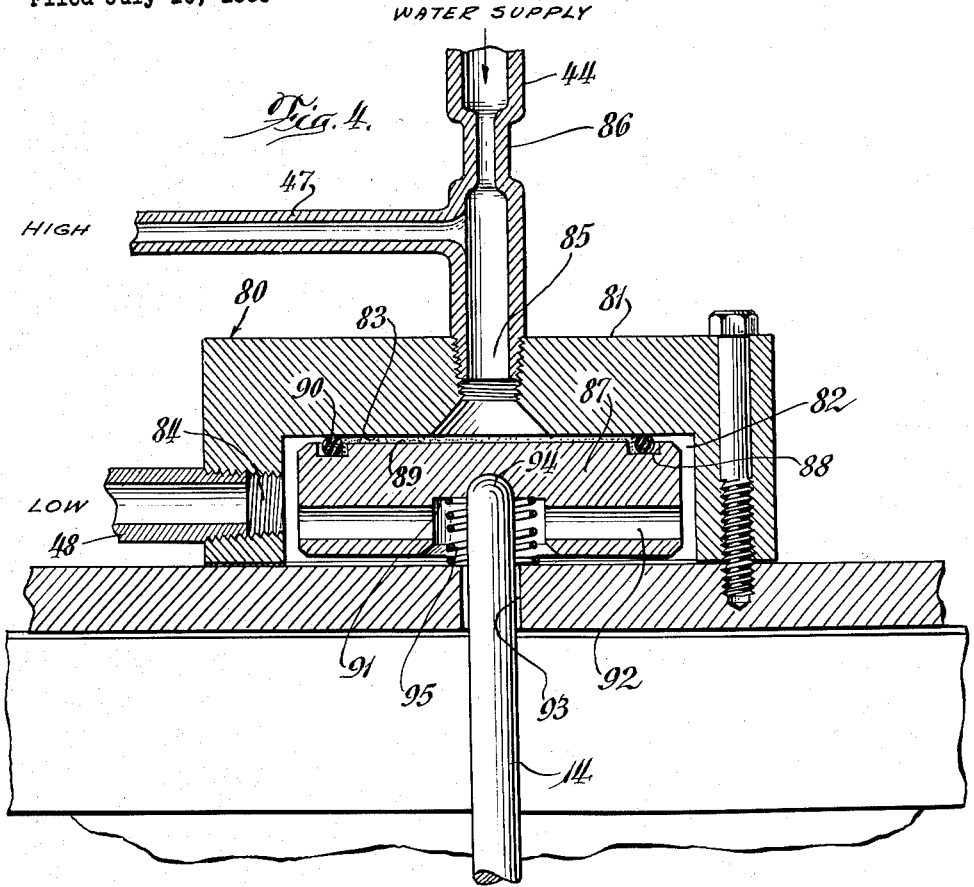
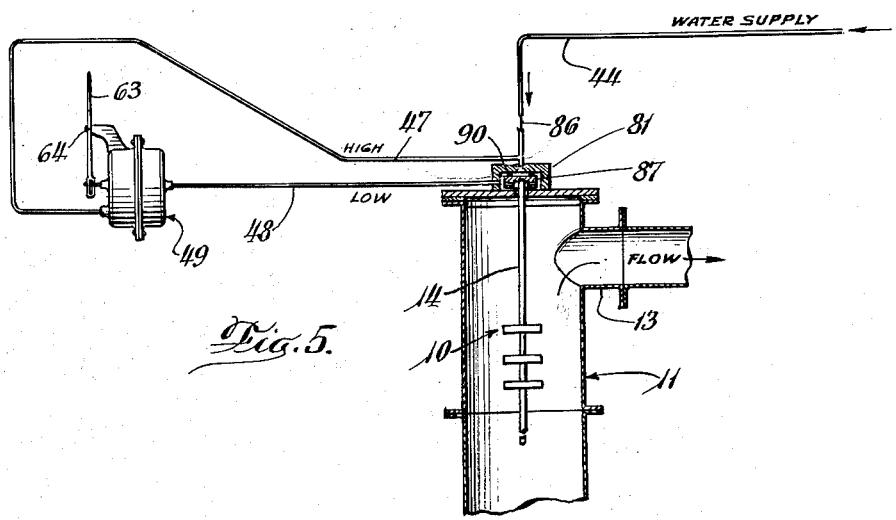

United States Patent Office 3,071,962
Patented Jan. 8, 1963

3,071,962
CONSISTENCY RESPONSIVE DEVICE
Fred D. Perkins, Jr., Childersburg, Ala., assignor to Kimberly-Clark Corporation, Neenah, Wis., a corporation of Delaware
Filed July 10, 1959, Ser. No. 826,352
8 Claims. (Cl. 73—59)

My invention relates to transducers and more particularly to consistency measuring and control devices.

It is desirable in connection with the manufacture of paper to measure the consistency of the slurry of paper stock, which is a slurry of the paper fibers in water, during various periods of the manufacturing process. This has been accomplished in the past by mechanism comprising a consistency responsive element disposed in a conduit through which the paper stock flows and which has a force in it varying with the consistency of the paper stock. A force measuring device is disposed on the conduit and is mechanically connected to the consistency responsive element. In order to sense material changes in stock consistency, however, the force measuring device on the conduit has necessarily been of rather delicate construction, and it has been found that the vibrations in the conduit induced by the flow of the paper stock through the conduit have damaged the delicate instrument, so that it is unreliable and actually inoperative for its intended function.

It is, therefore, an object of the invention to provide an improved transducer suitable for use in connection with such a consistency responsive element that provides a fluid force variable with the consistency of the stock which fluid force may be applied by suitable conduits to an indicator or meter or to a control device remotely located with respect to the conduit through which the stock flows, so that any vibrations of the conduit are ineffective on the transducer.

In such prior devices, it has also been found that unduly great variations in force on and movement of the consistency responsive element has resulted in breakage on the indicator located on the stock conduit, and it is therefore also an object of the invention to provide inhibiting mechanism in connection with the transducer preventing damage due to such excessive movements of the consistency responsive element.

In a preferred form of the transducer of the present invention, the consistency responsive element is effective on a pilot valve for admitting a supply of fluid under pressure, such as water, on to one side of a diaphragm, the other side of the diaphragm being connected to the first side through a fluid restriction, to provide a pressure differential on the two sides of the diaphragm which depends on the flow through the restriction. The pressure differential may then be read on an appropriate meter remotely located from the transducer, or the pressure differential may be used to control admission of water into the conduit through which the stock flows for the purpose of maintaining the consistency of the stock within narrow limits. Coacting shoulder portions are preferably provided on the housing for the diaphragm and the consistency responsive element for limiting the movement of the latter element.

It is also an object to so construct the transducer that any paper stock within the stock conduit is stopped from entering the transducer to prevent the paper fibers from collecting in the vicinity of the diaphragm or around the coacting shoulder portions so as to unduly inhibit movement of the diaphragm or consistency responsive element; and, in this connection, it is a more particular object to provide water purging connections for the diaphragm and coacting shoulder portions maintaining the fibers out of contact therewith.

In another preferred form of the transducer of the present invention, the consistency responsive element is effective on a valve member cooperating with an opposing face tending to close a conduit for water under pressure, when the consistency of the stock slurry increases as to put an increased force on the consistency responsive element. A fixed restriction is provided in the water pressure conduit, and the variation of water pressure in the conduit between the fixed restriction and the valve member, which in effect provides a variable restriction in connection with the opposing face, is indicative of the force on the consistency responsive element. Preferably a pressure differential meter or control system is utilized, and the pressure in the conduit between the valve member and the fixed restriction is used along with the pressure within the conduit through which the paper stock flows to control the differential meter or control system.

The invention consists of the novel constructions, arrangements and devices to be hereinafter described and claimed, for carrying out the above stated objects, and such other objects as will be apparent from the following description of preferred forms of the invention, illustrated with reference to the accompanying drawings, wherein:

FIG. 4 is a fragmentary longitudinal sectional view, similar to FIG. 2, of a modified form of transducer; and FIG. 5 is a schematic view of the modified transducer and associated parts.

Like characters of reference designate like parts in the several views.

Figure 1:
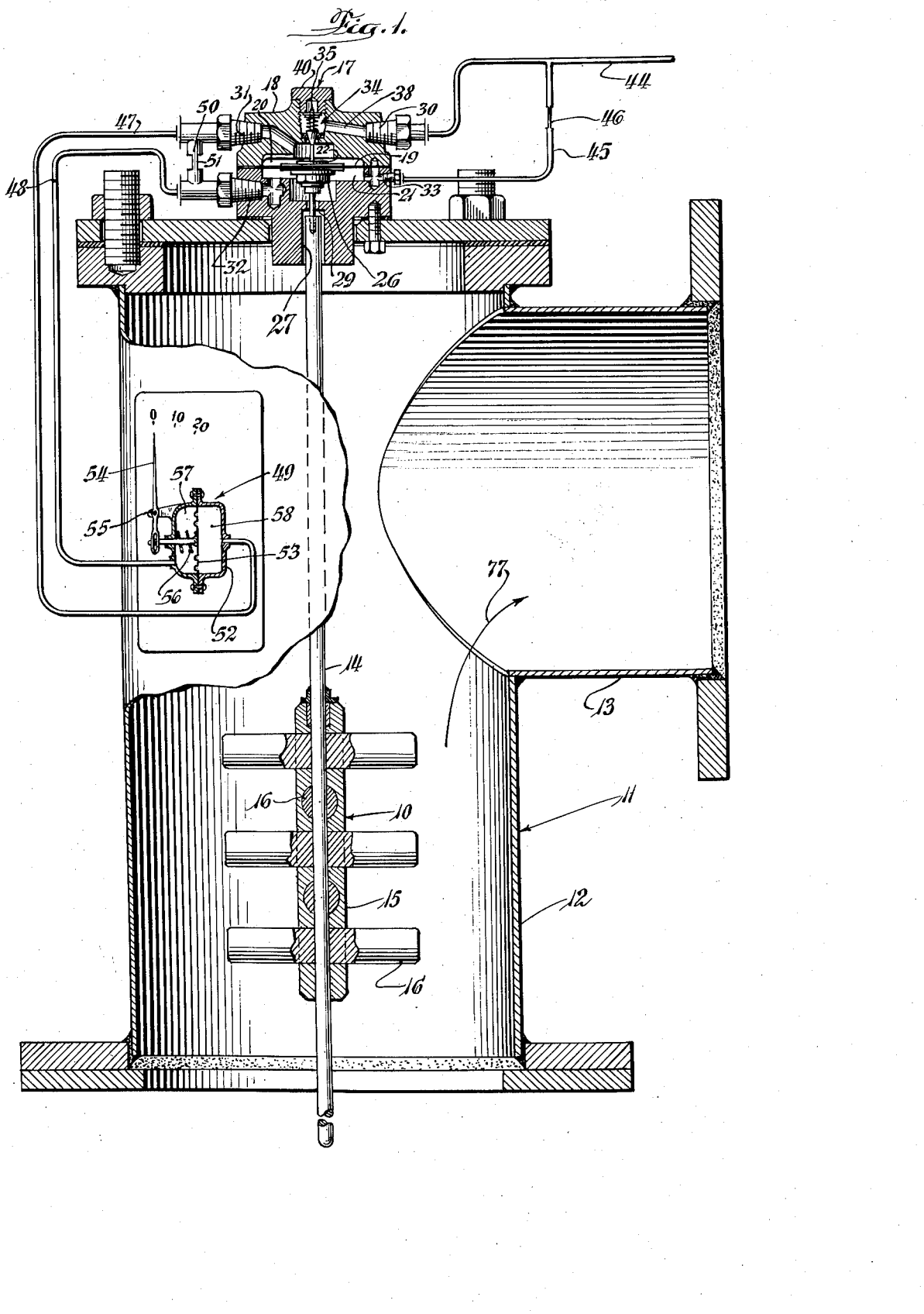
FIG. 1 is a longitudinal sectional view of a paper stock consistency measuring device including an improved force transducer which is connected to a meter.
Figure 2:
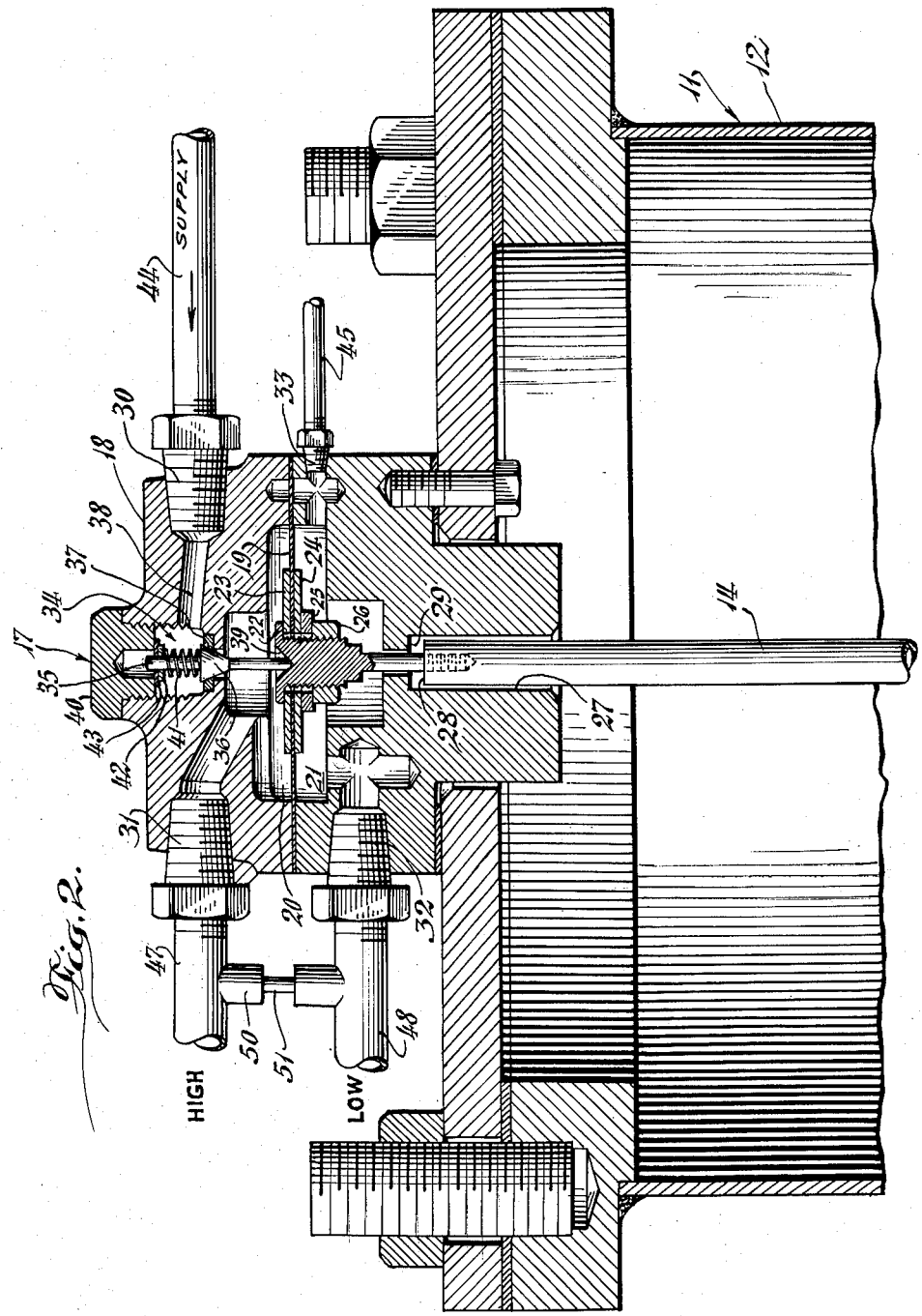
FIG. 2 is a fragmentary longitudinal sectional view on an enlarged scale of the transducer and associated parts.

Referring now to FIGS. 1 and 2, the illustrated consistency measuring system comprises a so called "war club" or stock consistency responsive element 10 suspended in a T 11. The T 11 is made up of an upstanding pipe or conduit 12 joined to and in communication with a horizontal pipe or conduit 13. The element 10 comprises a rod 14 having a tubular member 15 fixed thereon. A plurality of round shafts 16 are fixed to and extend outwardly from the tubular member 15.

A transducer 17 is mounted on top of the T 11 and comprises a housing 18 having a flexible diaphragm 19 therein which separates an upper cavity 20 from a lower cavity 21. The rod 14 is fixed to the diaphragm 19 at the center of the diaphragm. The connection is by means of a flange 22 on the upper end of the rod 14, washers 23 and 24 on the upper and lower surfaces respectively of the diaphragm, a smaller diameter washer 25 and a nut 26 threaded on the rod 14. As will be observed, the flange 22 lies on the upper washer 23, and the small diameter washer 25 is disposed between the nut 26 and the lower large diameter washer 24 on the lower side of the diaphragm 19.

The rod 14 extends through an opening 27 in the housing 18 and is provided with a shoulder 28 that is adapted to abut against a shoulder 29 at the top of the opening 27 for limiting the upward movement of the rod 14 in the housing 18. The housing 18 is provided with ports 30, 31, 32 and 33. The port 31 is connected to the upper cavity 20, and the ports 32 and 33 are connected to the lower cavity 21.

A pilot valve 34 is provided in the upper part of the housing 18. The pilot valve 34 comprises a plunger 35 having an enlarged tapered portion 36 adapted to fit on a valve seat 37 so as to close a passage 38 connecting the port 30 with the upper cavity 20. The rod 14 is provided with a groove 39 in its upper end into which the lower end of the plunger 35 extends. The plunger 35 extends into a hollow cap 40 screwed into the housing 18. A compression spring 41 is provided between the tapered valve portion 36 and washers 42 and 43 resting on the cap 40 for holding the valve portion 36 in closing relation with its seat 37.

The port 30 is connected to a conduit 44 constituting a source of water under a pressure, such as 100 pounds per square inch, for example. A conduit 45 having a restriction 46 therein is connected between the conduit 44 and the port 33. The ports 31 and 32 are respectively connected by means of conduits 47 and 48 with a meter 49. A passage 50 with a restriction 51 therein connects the conduits 47 and 48.

The meter 49 may be any suitable water pressure differential measurement device and, as illustrated, comprises a housing 52 having a diaphragm 53 extending between its sides. An indicator needle 54 pivotally mounted at 55 is fixed by any suitable mechanism to the center of the diaphragm 53, and a spring 56 is provided between the housing 52 and the diaphragm for yieldably holding the needle 54 in a zero position. The housing 52 provides cavities 57 and 58 on opposite sides of the diaphragm 53. The cavity 57 is connected to the conduit 48, and the cavity 58 is connected to the conduit 47.

For a water pressure on the order of 100 pounds per square inch, as previously suggested, the restriction 46 may have a diameter of 1/64 inch and the restriction 51 may have a diameter of 1/32 inch, for example.

The meter 49 indicates, as will be subsequently described, the differences in water pressure within the cavity 20 and cavity 21 and thus the consistency of the stock flowing through the T 11. In lieu of simply measuring the stock consistency, the differences between the pressures within the conduits 47 and 48 may be used in a control system for automatically maintaining the stock consistency uniform. Such a control system is shown in FIG. 3.

Figure 3:
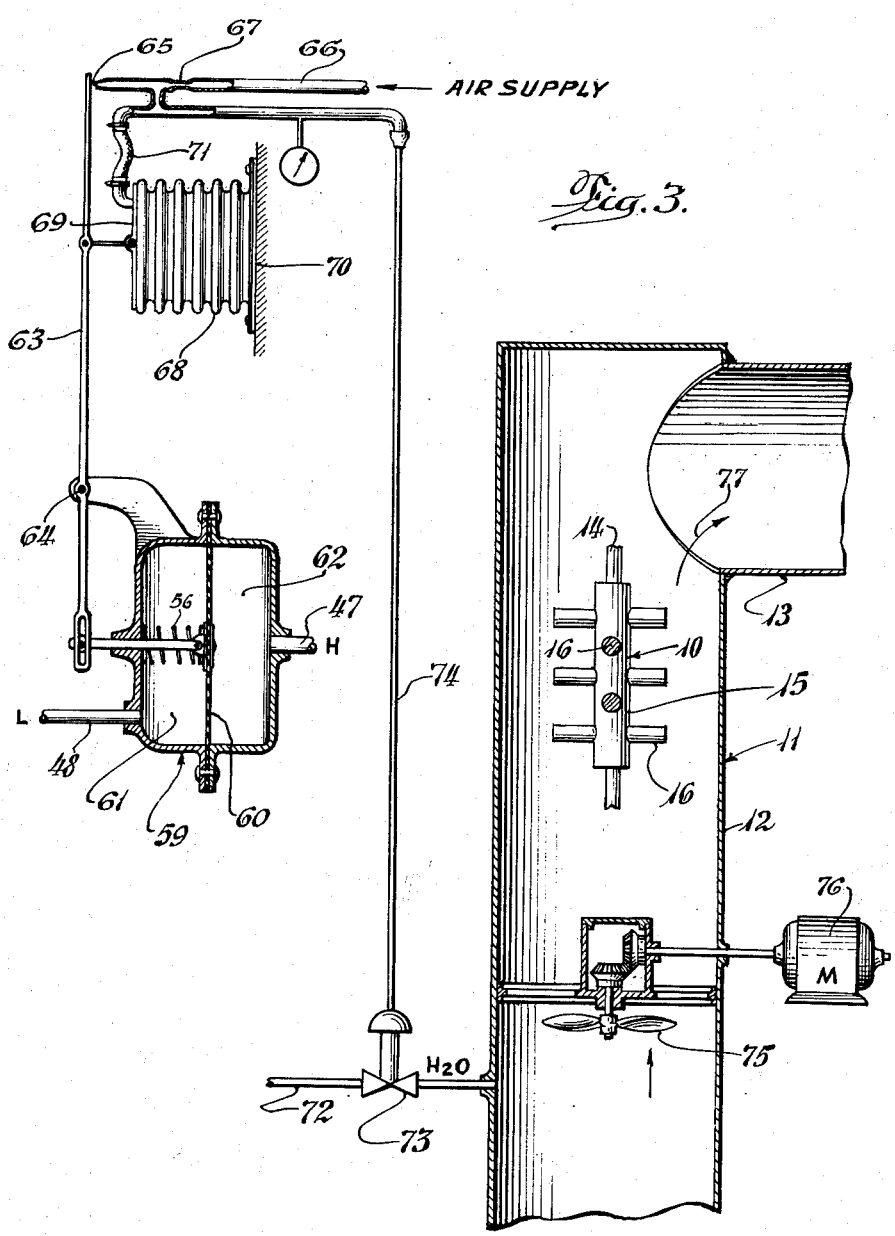
FIG. 3 is a diagrammatic view of a consistency control system which may be connected to the transducer in lieu of the meter.

The FIG. 3 control system comprises a housing 59 having a flexible diaphragm 60 fixed therein so as to extend between opposite sides of the housing and define cavities 61 and 62. The cavity 61 is connected to the conduit 48, and the cavity 62 is connected to the conduit 47.

A control arm 63 is pivoted at 64 and is connected by any suitable connecting mechanism at one end of the arm to the diaphragm 60, substantially at the center of the diaphragm. The upper end of the arm 63 is in close proximity to a jet 65 provided in the end of a conduit 66 connected to a source of air under pressure. A restriction 67 is within the conduit 66.

An expansive bellows 68 has one of its ends 69 connected to the arm 63 above the pivot 64, and the other end 70 of the bellows is held fixed. The bellows 68 is connected by means of a conduit 71 to the conduit 66 at a point between the restriction 67 and the jet 65.

A pipe 72 containing water under pressure extends into the pipe 12. An air pressure actuated valve 73 of any suitable type is provided in the conduit 72 for metering the water supplied into the conduit 12 in accordance with the air pressure applied on to the valve 73. The valve 73 is connected by means of an air pressure conduit 74 with the conduit 71.

A mixer propeller 75 is provided in the conduit 12 and is driven by a motor 76 located outside of the conduit 12.

The meter 49 when connected to the transducer 17 measures the consistency of paper stock slurry flowing upwardly through the pipe 12 and into the pipe 13 as indicated by the arrow 77. The paper stock flowing upwardly around the shafts 16, due to the viscosity of the paper stock, produces an upward force on the shafts 16 and thus on the rod 14, the force being greater with increased stock consistency and viscosity and being less for decreased stock consistency and viscosity. The transducer 17 in conjunction with the meter 49 measures the force on the consistency responsive element 10 and thus gives an indication of the stock consistency and any changes thereof.

Such an upward force on the rod 14 moves the rod 14 upwardly and likewise moves the valve plunger 35 upwardly to move the tapered plunger portion 36 off the seat 37 against the action of the spring 41. Water then flows from the conduit 44, through the port 30, the passage 38 and the valve seat 37, around the tapered plunger portion 36, to the cavity 20. The water in the cavity 20 continues its flow through the port 31, the conduit 47, the passage 50, the restriction 51, the conduit 48 and the port 32 into the lower cavity 31, from whence the water is relieved through the opening 27 into the pipe 12. Due to the action of the restriction 51, there is a certain difference in pressure between the water in the cavities 20 and 21 which balances the upward force on the rod 14, maintaining the pilot valve 34 opened just sufficiently so that the higher water pressure in the cavity 20 exactly balances the lower water pressure in the cavity 21 and the upward force on the stock responsive element 10. In other words, the flow of water through the restriction 51 between the two cavities 20 and 21 results in a loss of pressure, so that the pressure on the upper side of the diaphragm 19 is greater than the pressure on the lower side of the diaphragm 19, hydraulically counterbalancing the force from the war club 10. Since the loss of pressure through the restriction 51 increases with the rate of water flow, and since the rate of water flow increases with an increase in force from the war club 10 tending to open the pilot valve 34 further, all forces remain in balance regardless of variations of force from the flow responsive element 10, and the water pressure in the chamber 20 increases along with increases of force on the element 10 with increased stock consistency. The pressure loss through the restriction 51 is always in direct proportion to the force from the flow responsive element 10, and a measurement of this loss in pressure amounts to a measurement of the force exerted on the flow responsive element 10 by the paper stock flowing upwardly through the pipe 12. The rod 14 fits quite closely within the opening 27 acting as a restriction and maintaining a small difference of pressure between the slurry in the pipe 12 and the water in the chamber 21 and thus helping to maintain the pressure in the upper chamber 20 also.

The difference in pressure of the water within the conduits 47 and 48 is measured by the meter 49. The relatively high water pressure within the conduit 47 from the chamber 20 is applied on one side of the diaphragm 53 tending to move the diaphragm in one direction so as to swing the needle 54 about its pivot 55. Such movement of the diaphragm 53 and needle 54 is against the action of the relatively low water pressure in the conduit 48 from the chamber 21 applied to the other side of the diaphragm 53 and the action of the spring 56. Thus the movement of the needle 54 about its pivot point 55 indicates the difference in pressure existing in the conduits 47 and 48 and thus the upward force on the flow responsive element 10 and the consistency of the stock flowing through the pipes 12 and 13.

Excessive movement of the element 10 upwardly under an undue increase in consistency of paper stock is prevented by the shoulder 28 coacting with the shoulder 29. The shoulder 28 under these conditions strikes the shoulder 29 and limits the upward movement of the element 10. As has been explained, the water from the lower cavity 21 flows through the opening in the shoulder 29 and the opening 27 into the pipes 12 and 13. This flow of water thus purges the lower cavity 21, so as to assure that the paper stock does not fill the lower cavity or otherwise impede the movement of the diaphragm 19, and also purges the opening 27, whereby paper fibers do not interfere with movement of the rod 14 and the stop action of the shoulder 28 on the shoulder 29.

When the consistency of the stock decreases materially, there is little upward force on the flow responsive element 10, and the pilot valve 34 substantially closes. Under these conditions, possibly, stock could enter the lower cavity 21 through the opening 27, and for the purpose of purging the lower cavity under these conditions, the conduit 45 together with the restriction 46 have been provided. The conduit 45 provides a small flow of water through the lower cavity 21 and into the pipes 12 and 13, just sufficient for maintaining the lower cavity 21 free from stock. The flow of water through the conduit 45 is so small that it does not materially dilute the stock passing through the pipes 12 and 13. This constant flow of water does not change the pressure response by the transducer 17 in view of the fact that the transducer 17 measures the drop of pressure across the restriction 51 which is directly between the two cavities 20 and 21. The water flow through the conduit 45 does provide a slight pressure increase on the bottom side of the diaphragm 19; however, since the restriction 46 is not directly between the two cavities 20 and 21, the upper cavity 20 has the same pressure induced in it as is induced in the lower cavity 21 by the flow of water through the conduit 45, due to the flexibility of the diaphragm 19. Thus, the slightly higher pressure in the lower cavity 21 resulting from water flow through the conduit 45 results in an equally higher pressure in the upper cavity 20, so that the resultant signal to the meter 49 is not changed.

The control system as seen in FIG. 3 may be substituted for the meter 49 and functions to maintain the consistency of paper stock flowing through the pipes 12 and 13 substantially uniform. When the consistency responsive element 10 moves upwardly with an increase in consistency of the paper stock, the pilot valve 34 is opened, as previously described, to cause an increase in the differential of pressures in the conduits 47 and 48. This increase in pressure differential acts on the diaphragm 60 moving it to the left as seen in FIG. 3 and causing slight clockwise rotation of the arm 63 about its pivot point 64. The arm 63 on this movement closes the jet 65 to a greater extent than previously and raises the pressure within the conduits 71 and 74 and within the bellows 68. The bellows 68 expands slightly on this increase in pressure and moves the arm 63 slightly in the opposite direction tending to open the jet 65. This action of the bellows 68 in moving the arm 63 away from the jet 65 is to assure that only a pressure increase within the conduits 71 and 74 is provided that corresponds to the increase in pressure differential on the diaphragm 60 and to make the increase in pressure within the conduit 74 proportional to the increase in pressure differential on the diaphragm 60.

The increase in air pressure within the conduit 74 is effective on the air pressure operated valve 73 to increase the flow of water through the conduit 72 and into the pipe 12 so as to decrease the consistency of the paper stock to its optimum value. The water as it enters the pipe 12 from the conduit 72 is mixed with the rest of the stock due to the action of the mixing propeller 75 driven from the motor 76.

When paper stock flowing in the pipe 12 is too thin, it is not as effective on the consistency responsive element 10, and the element 10 moves downwardly slightly so as to cause corresponding closing movement of the pilot valve 34. The pressure differential on the diaphragm 60 is thus decreased, so that the pressure in the conduit 74 which is too high under these conditions for the corresponding water differential pressure is effective through the bellows 68 to move the arm 63 in a counterclockwise direction about its pivot 64 as to reduce the air pressure in the conduit 74 whereby it again corresponds to the water pressure differential on the diaphragm 60. The water flow through the conduit 72 and the pipe 12 is thus decreased to a proper level.

Thus, if the consistency of the stock in the pipe 12 becomes too great, the element 10 is raised, the pilot valve 34 is opened to increase the water pressure differential, and the air pressure in the conduit 74 is increased to increase the water flow through the conduit 72 into the pipe 12 to bring the stock consistency down to a proper level. Conversely, an unduly low stock consistency flowing through the pipe 12 results in a lowering of the element 10, a closing of the pilot valve 34, a reduction in water pressure differential effective of the diaphragm 60 and a reduction in the air pressure in the conduit 74 with a resultant decrease of water flow through the conduit 72 into the pipe 12. Thus, the transducer 17 functioning in connection with the control system shown in FIG. 3 functions to maintain the consistency of the stock flowing through the pipes 12 and 13 at a predetermined value within close limits.

Either the meter 49 or the control system as shown in FIG. 3 may be located at a place quite apart and remote from the pipes 12 and 13. Only the transducer 17 is positioned in the same assembly as the pipes 12 and 13, and any vibrations of the pipes 12 and 13 due to fluid flow therethrough are thus not effective on any sensitive meter or control mechanism. As has been described, only the water conduits 47 and 48 connect the transducer 17 with the meter or control system. The transducer 17 in itself is a relatively rugged instrument which is not subject to misadjustment due to the vibrations of the pipes 12 and 13 and is a relatively simple instrument having a minimum number of parts so as to be inexpensive to manufacture. It is not subject to breakage due to unduly large movements of the consistency responsive element 10 due to the coacting shoulder portions 28 and 29 and is so constructed that the stock in the pipes 12 and 13 does not hamper or change its response particularly since the lower chamber 21 is continually water purged.

Referring now to FIGS. 4 and 5, a modified design of transducer 80 is illustrated. The transducer 80 comprises a housing 81 which is fixed and is sealed with respect to the upper surface of the T 11. The housing 81 is formed with an internal cavity 82 having an upper plane surface 83. The housing 81 is provided with ports 84 and 85. The supply conduit 44 is connected to the port 85, and the conduit 48 is connected to the port 84.

In this embodiment, the supply conduit 44 is provided with a restriction 86 in it, and the conduit 47 is connected to the conduit 44 between the restriction 86 and the port 85. In this case, the bypass restriction 51 is omitted between the conduits 47 and 48.

A valve member or restriction block 87 is provided within the cavity 82. The block 87 has a circular groove 88 cut in its upper plane surface 89 which faces the surface 83, and an O ring 90 of yieldable rubberlike material is disposed in the groove 88 and is adapted to make contact with and seal with the plane surface 83.

The valve member 87 is provided with a central cavity 91 and radial passages 92 extending through the block. The rod 14 extends through an opening 93 in the upper portion of the T 11 and has a rounded end 94 which fits within a correspondingly rounded extension of the cavity 91. A spring 95 is disposed in the cavity 91 between the upper portion of the T 11 and the end of the cavity 91.

The transducer 80 may be substituted for the transducer 17 either in connection with the meter 49 or in connection with the control system illustrated in FIG. 3. The transducer 80 is illustrated in FIG. 5 in connection with the meter 49, and in either connection the transducer provides a differential of pressures in the conduits 47 and 48 which increases with the force on the war club 10 similarly to the transducer 17.

The conduit 48 has substantially the same pressure within it as that within the T 11 due to the fact that the conduit 48 is connected with the T 11 by means of the opening 93, the cavity 91, the passages 92 and the cavity 82.

As in the previously described embodiments, paper stock flow through the T 11 results in upward force on the war club 10, the magnitude of which is a function of the stock consistency. The differential of pressures that exists between the conduits 47 and 48 provides a measurement of this force. The transducer 80 transforms the force on the war club 10 into a corresponding pressure differential, due to the action of the fixed restriction 86 in the water supply conduit 44 and a variable restriction effectively connected in series with the fixed restriction. The variable restriction is provided by the valve member 87 partially sealing by means of its O ring 90 on the plane surface 83 providing a resistance to water flow through the conduit 44 increasing with the upward force on the valve member 87.

The pressure of the water in the conduit 44 is higher than the pressure inside the T 11, and therefore water flows through the fixed restriction 86 and the variable restriction, provided by the valve member 87 sealing by means of the sealing ring 90 on the adjacent plane surface 83 of the housing 81, into the T 11. During this flow, there is a pressure drop through both restrictions which is equal to the difference in pressure between the water supply pressure and the pressure within the T 11. This total pressure drop is divided between the fixed restriction 86 and the variable restriction provided by the valve member 87 in such a way that the drop across the variable restriction is in direct proportion to the force on the war club 10. This is due to the fact that when there is an increase in force upwardly on the war club 10, the valve member 87 tends to close the restriction provided by the O ring 87, partially sealing to a greater extent against the plane housing surface 83, so as to increase the pressure drop across this variable restriction. Conversely, when the force on the war club 10 decreases, the O ring 90 is less forcefully urged against the plane surface 83 and tends to open the variable restriction and decrease the pressure drop across the variable restriction. A condition of equilibrium is established and maintained at which the pressure drop across the variable restriction multiplied by the effective area of the restriction is equal to the force upwardly from the war club 10. The effective area of the variable restriction is approximately the area enclosed by the O ring 90. Since the effective area is constant, the pressure drop across the variable restriction is a direct function of the force from the war club 10. The force on the valve element 87, due to the fluid pressure from the conduit 44 on the upper surface of the valve element 87 included within the O ring 90, balances the upward force on the rod 14 from the war club 10. Measurement of the pressure drop across the variable restriction amounts to a measurement of the force from the war club. Therefore, the conduits 47 and 48 are respectively connected to the upper surface of the valve element 87 and to the lower faces of the valve element 87, and the pressure differential may be applied to the meter 49, to give an indication of the upward force on the war club 10 and thus the consistency of the stock flowing upwardly through the T 11.

It will be observed that the variable restriction provided by the O ring 89 acting against the plane surface 83 of the housing 81 is of a type that is arranged so that the upward force from the war club 10 closes it. The rounded upper end 94 of the rod 14 is disposed within a corresponding rounded cavity extension in the valve member 87 allows free alignment of the O ring 90 and the seating surface 83. It is contemplated that the spring 95 shall have a tension which is just sufficient so as to support the weight of the valve member 87 in water; and the spring also helps the valve member 87, acting as a restriction, to serve as a check valve in case of malfunction, when paper stock tends to back up toward the water supply conduit 44. In the normal operation, the flow of water through the conduit 44 keeps the restriction formed by the valve member 87 acting against the plane surface 83 purged free of stock.

The transducers 17 and 80, although particularly useful in connection with a consistency measuring device, are suitable for use for the measurement of other forces, particularly forces exerted inside a closed vessel. In general, it will be observed that the function of the transducers 17 and 80 is to convert a mechanical force inside a closed vessel to a differential pressure signal on the outside of the vessel. The transducers are so arranged that as the force varies, the differential pressure signal varies also in direct proportion to the force. Measure of the pressure differential signal with commercially available instruments thereby amounts to a measurement of the force.

I wish it to be understood that the invention is not to be limited to the specific constructions and arrangements shown and described, except only insofar as the claims may be limited, as it will be understood to those skilled in the art that changes may be made without departing from the principles of the invention.

What is claimed is:

1. In transducer mechanism, a pressure responsive member, means for mounting said member to provide a cavity on each side thereof, a pilot valve connectable to a source of fluid under pressure for applying fluid pressure to the said cavity on one side of said member, a probe element adapted to have an external force applied to it, said element being connected to said member and being in operative relationship with said pilot valve for opening the valve due to said force, a restricted fluid passage connecting said cavities on opposite sides of said member for causing a differential of fluid pressure applied to the two sides of the member to increase in accordance with an increasing external force applied to said probe element and to thereby apply a force on said pressure responsive member and on said probe element opposing said external force, means forming a relief passage from said cavity on the side of said pressure responsive member opposite said pilot valve, and fluid pressure responsive means connected to said two cavities so as to be responsive to the changes of pressure differential on the two sides of the member and thereby to changes in the external force applied on said probe element.

2. In transducer mechanism, a housing, a diaphragm within said housing and dividing the housing into first and second chambers, a pilot valve connectable to a source of fluid under pressure for supplying fluid to said first chamber, a probe element adapted to have an external force applied to it, said element extending through said housing and being connected to said diaphragm and being in operative relationship with said valve for opening the valve, a restricted fluid relief passage connected to said second chamber, a restricted fluid passage connecting said two chambers for causing a differential of fluid pressure applied to the two sides of the diaphragm to increase in accordance with the external force applied to said probe element and to thereby apply a force on said diaphragm and on said element opposing said external force, and fluid pressure responsive means connected to said two chambers so as to be responsive to the changes of pressure differential on the two sides of said diaphragm and thereby to changes in the external force applied on said probe element.

3. In transducer mechanism, a housing, a diaphragm within said housing and dividing the housing into first and second chambers, a pilot valve within said housing and connectable to a source of fluid under pressure for thereby applying a fluid pressure within said first chamber, a probe element adapted to have an external force applied to it and extending loosely through said housing into said second chamber so as to provide a restricted fluid outlet around the probe element, said element being connected to said diaphragm and being in operative relationship with said pilot valve for opening the valve due to said force, said housing and probe element having coacting shoulders for limiting the movement of the probe element inwardly into said housing, a restricted fluid passage connecting said two chambers for causing a differential of fluid pressure applied to the two sides of the diaphragm to increase in accordance with the external force applied to said probe element and to thereby apply a force on said diaphragm and on said element opposing said external force, and fluid pressure responsive means connected to said two chambers so as to be responsive to the changes of pressure differential on the two sides of said diaphragm and thereby to changes in the external force applied on said probe element.

4. In a slurry consistency responsive device, a conduit through which slurry flows, a probe element extending into said conduit so as to have an external force applied to it by the slurry flowing through the conduit, a diaphragm, means mounting said diaphragm so as to provide first and second cavities on opposite sides of the diaphragm, a pilot valve connectable to a source of fluid under pressure for applying fluid pressure to said first cavity, said probe element being connected to said diaphragm and being in operative relationship with said valve for opening the valve due to said force, a restricted passageway connecting said second cavity with said conduit, means providing a restricted passageway connecting said first cavity to said second cavity for causing the differential of fluid pressure within said two cavities and applied to the two sides of the diaphragm to increase in accordance with the external force applied to said probe element and to thereby apply a force on said diaphragm and on said element opposing said external force, and fluid pressure responsive means connected to said two cavities so as to be responsive to the changes of pressure differential on the two sides of the diaphragm and thereby to changes in the external force applied on said probe element.

5. In a slurry consistency responsive device, a housing, a diaphragm in said housing dividing said housing into first and second chambers, a conduit through which slurry flows, a probe element extending through said housing and conduit and into said conduit so as to have an external force applied to it by the slurry flowing through the conduit, a pilot valve connectable to a source of fluid under pressure for supplying fluid pressure to said first chamber, said probe element extending through said second chamber and being attached to said diaphragm and being in operative relationship with said valve for opening the valve due to said external force, said probe element extending loosely into said housing so as to provide a fluid outlet passageway from said second chamber into said conduit, and said housing and probe element being provided with coacting shoulders for limiting the movement of the probe element in a valve opening direction, means providing a restricted passageway connecting said two chambers for causing a differential of fluid pressure on said diaphragm to increase in accordance with the external force applied to said probe element and to therefore apply a force on said diaphragm and on said element opposing said external force, and fluid pressure responsive means connected to said two chambers so as to be responsive to the changes of pressure differential on the two sides of the diaphragm and thereby to changes in the external force applied on said probe element.

6. In a slurry consistency responsive device, a first conduit through which slurry flows, a transducer disposed on a wall of said conduit, said transducer comprising a housing having a diaphragm therein dividing the housing into first and second chambers and a pilot valve in the housing, a second conduit connectable to a source of liquid under pressure and connected to said pilot valve so that the pilot valve supplies fluid under pressure within said first chamber when the pilot valve is open, a probe element extending into said first conduit and through said housing into said second chamber, said probe element being attached to said diaphragm and being in operative relationship with said valve for opening the valve due to force on the probe element caused by slurry flow through said first conduit, said probe element extending through said housing so as to provide a restricted liquid relief passageway from said second chamber into said first conduit, and said housing and probe element having abutting shoulder portions for limiting the movement of the probe element in a pilot valve opening direction, means providing a restricted passageway connecting said two chambers for causing a differential of liquid pressure applied to the two sides of the diaphragm to increase in accordance with the force applied to said probe element by the slurry in said first conduit and to thereby apply a force on said diaphragm and on said element opposing said force, means providing a restricted passageway directly connecting said second conduit which is connectable to said source of liquid under pressure and said second chamber for providing a continual purging effect within said second chamber and through said relief passageway between said housing and probe element, and fluid pressure responsive means connected to said two chambers so as to be responsive to the changes of pressure differential on the two sides of said diaphragm and thereby to changes in the force applied on said probe element by the slurry in said first conduit.

7. In a mechanism responsive to the flow of slurry of paper stock, a diaphragm, means for mounting said diaphragm so as to provide first and second cavities on opposite sides thereof, a pilot valve connectable to a source of water pressure for applying the pressure within said first cavity when the valve is open, a conduit through which the paper stock slurry flows including a wall portion separating the conduit from said second cavity, a probe element extending through said wall portion and connected to said diaphragm and being in opreative relationship with said pilot valve for opening the valve due to a force on the probe element caused by the slurry flowing through said conduit, said probe element and said wall portion having abutting parts for limiting the movement of the probe element in the pilot valve opening direction, and means providing a restricted passageway of fixed size connecting said first cavity to said conduit and including a passage between said wall portion and the external surface of said probe element extending therethrough for causing fluid passing through said pilot valve into said first cavity and applied on said diaphragm to increase in pressure in accordance with an increased force applied on said probe element.

8. In a mechanism responsive to the flow of slurry of paper stock, a conduit through which the slurry flows, a transducer mounted on said conduit and having a housing, a diaphragm in said housing dividing the housing into first and second chambers, a pilot valve in said housing and connectable to a source of water pressure for supplying the water pressure to said first chamber, a probe element extending through a wall of said housing into said conduit so as to have an external force applied to it by the slurry flowing through the conduit, said probe element being connected to said diaphragm and being in operative relationship with said valve and opening said valve due to said force, means providing a restricted passageway connecting said two chambers for causing the differential of fluid pressure applied to the two sides of the diaphragm to increase in accordance with the external force from said slurry applied to said probe element and to thereby apply a force on said diaphragm and on said element opposing said external force, and shoulder portions provided on said element and on said housing which coact to limit the movement of said element in a pilot valve opening direction, said housing and element having a relief passageway disposed there-between connected with said second chamber for preventing an accumulation of fiber from the stock slurry between said coacting shoulder portions.

References Cited in the file of this patent

UNITED STATES PATENTS

| | | |
|---|---|---|
| 1,888,431 | Osbourne | Nov. 22, 1932 |
| 2,171,312 | Meyers | Aug. 29, 1939 |
| 2,451,451 | Tate | Oct. 12, 1948 |
| 2,493,012 | Moore et al. | Jan. 3, 1950 |
| 2,579,226 | Cram | Dec. 18, 1951 |
| 2,587,760 | Proirier | Mar. 4, 1952 |
| 2,593,906 | Markson | Apr. 22, 1952 |
| 2,597,138 | Trigg | May 20, 1952 |
| 2,655,936 | Wexler et al. | Oct. 20, 1953 |
| 2,773,507 | Norris | Dec. 11, 1956 |
| 2,914,076 | Zimmerli | Nov. 24, 1959 |